(12) United States Patent  
Donovan et al.

(10) Patent No.: US 12,474,230 B2  
(45) Date of Patent: Nov. 18, 2025

(54) STRUCTURE PLUMBING FLOW SIMULATION APPARATUS

(71) Applicant: STATE FARM MUTUAL AUTOMOBILE INSURANCE COMPANY, Bloomington, IL (US)

(72) Inventors: John R. Donovan, Bloomington, IL (US); Richard Jan Tjaden, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 327 days.

(21) Appl. No.: 18/233,153

(22) Filed: Aug. 11, 2023

(65) Prior Publication Data

US 2024/0426704 A1    Dec. 26, 2024

Related U.S. Application Data

(60) Provisional application No. 63/521,923, filed on Jun. 20, 2023.

(51) Int. Cl.
*G01M 3/28* (2006.01)
*G01M 13/003* (2019.01)
*G05D 7/06* (2006.01)
*G01M 3/00* (2006.01)

(52) U.S. Cl.
CPC ........ *G01M 3/2876* (2013.01); *G01M 3/2815* (2013.01); *G01M 13/003* (2019.01); *G05D 7/0688* (2013.01); *G01M 3/007* (2013.01)

(58) Field of Classification Search
CPC ........ G01M 3/26; G01M 3/28; G01M 3/2807; G01M 3/2876; G01M 3/2815; G01M 13/003; G01M 3/007; G05D 7/0688
See application file for complete search history.

(56) References Cited

U.S. PATENT DOCUMENTS

| 9,080,924 B2 * | 7/2015 | Welker ................. G01M 3/2876 |
| 2006/0287837 A1 * | 12/2006 | Garnaes .............. G01M 3/2807 702/51 |
| 2018/0320827 A1 * | 11/2018 | Hull ..................... G01M 3/2815 |
| 2019/0063689 A1 * | 2/2019 | Liu ...................... G01M 3/2815 |

* cited by examiner

*Primary Examiner* — Benjamin R Schmitt
(74) *Attorney, Agent, or Firm* — MARSHALL, GERSTEIN & BORUN LLP

(57) ABSTRACT

A structure plumbing flow simulation apparatus is described herein. An example structure plumbing flow simulation apparatus may include: (1) a reservoir configured to hold a set volume of a liquid; (2) a pump connected to the reservoir configured to pump the liquid; (3) a pressure source connected to the pump and configured to pressurize the liquid from the pump which flows to a water shut off valve downstream of the pressure source; (4) one or more pipes connected to the pressure source and adapted to be connected to the water shut off valve; and/or (5) a pipette connected to the one or more pipes.

21 Claims, 4 Drawing Sheets

STRUCTURE PLUMBING FLOW SIMULATION APPARATUS

CROSS REFERENCE TO RELATED APPLICATIONS

The present application claims the benefit of U.S. Provision Patent Application No. 63/521,923, entitled "Structure Plumbing Flow Simulation Apparatus," filed on Jun. 20, 2023, which is hereby expressly incorporated by reference herein in its entirety.

BACKGROUND

Water shut off valves monitor and control the primary water supply of a building. When a leak, plumbing blockage, or excessive water consumption is detected, the water shut off valve blocks water to the building and will alert occupants of the issue.

Water shut off valves need to be highly reliable and accurate to prevent false alarms or failures during critical moments. As such, thorough testing may be necessary to validate their responsiveness, accuracy, and ability to shut off the water supply promptly and completely.

However, conventional valves may not provide a reliable way to test water shut off valves in a controlled environment. Conventional techniques may include additional ineffectiveness, inefficiencies, encumbrances, and other drawbacks as well.

BRIEF SUMMARY

In some embodiments, a hydraulic system for testing water shut off valves may be provided. The hydraulic system may include: (1) a reservoir configured to hold a set volume of a liquid; (2) a pump connected to the reservoir configured to pump the liquid; (3) a pressure source connected to the pump and configured to pressurize the liquid from the pump which flows to a water shut off valve downstream of the pressure source; (4) one or more pipes connected to the pressure source and adapted to be connected to the water shut off valve, wherein the one or more pipes are configured to simulate one or more plumbing flows across a structure; and/or (5) a pipette connected to the one or more pipes, wherein the pipette is configured to simulate a plumbing leak of the one or more pipes. The hydraulic system may be configured to detect whether the water shut off valve accurately controls a flow rate of the liquid based upon one or more of: (i) the simulated one or more plumbing flows or (ii) the simulated plumbing leak. The hydraulic system may include additional, less, or alternate functionality, including those discussed elsewhere herein.

Additionally or alternatively, in some embodiments, the hydraulic system may further include one or more electronic valves connected to the one or more pipes, wherein each of the one or more electronic valves control a flow rate of the liquid passing through a corresponding connected pipe; one or more sensors; and/or a Programable Logic Controller (PLC) communicatively coupled to the one or more sensors and the one or more electronic valves. In some embodiments, the PLC may be configured to control the flow rate of the liquid through the one or more electronic valves and/or control a pump speed of the pump.

In some embodiments, the one or more sensors may include a low water sensor configured to detect a water level in the reservoir, wherein the low water sensor is configured to turn off the pump upon detection that the reservoir is holding less than a threshold volume of the liquid. In these embodiments, the PLC may be further configured to detect, via the low water sensor, whether the reservoir is holding less than the threshold volume of the liquid and/or in response to detecting the reservoir is holding less than the threshold volume, turn off the pump.

Additionally or alternatively, in some embodiments, the one or more sensors may include a pressure sensor configured to detect a current pressure at the pressure source, wherein the pressure sensor is configured to turn off the pump upon detection that the current pressure at the pressure source is greater than a threshold maximum pressure. In these embodiments, the PLC may be further configured to detect, via the pressure sensor, that the current pressure at the pressure source is greater than the threshold maximum pressure and/or in response to detecting the current pressure at the pressure source is greater than the threshold maximum pressure, turn off the pump. In some embodiments, the threshold maximum pressure may be approximately 80 psi. Additionally or alternatively, in some embodiments, the PLC may be further configured to detect, via the pressure sensor, that the current pressure at the pressure source is less than a threshold minimum pressure and/or in response to detecting the current pressure at the pressure source is less than the threshold minimum pressure, turn on the pump. In some embodiments, the threshold minimum pressure may be approximately 40 psi.

Additionally or alternatively, in some embodiments, the hydraulic system may further include a shut off-switch connected to the pump, wherein activation of the shut-off switch turns off the pump; one or more drains connecting the one or more pipes and the pipette to the reservoir; the water shut off valve configured to monitor the flow rate of the liquid; a scaffolding configured to support one or more of: the reservoir, the pump, the pressure source, the one or more pipes, the pipette, the water shut off valve, or the one or more drains; and/or an overflow tube connected to the reservoir, the overflow tube configured to allow for at least some of the liquid to escape the reservoir when an amount of the liquid exceeds the first set volume.

In other embodiments, a computer-implemented method for testing water shut off valves may be provided. The computer-implemented method may be implemented via one or more local or remote processors, transceivers, sensors, servers, memory units, mobile devices, wearables, and/or other electronic or electrical components. In one instance, the computer-implemented method may include: (1) transmitting a control signal to a pump to control a flow rate of a liquid flowing from the pump; (2) transmitting, by the one or more processors, one or more control signals to at least one of one or more electronic valves coupled to (i) one or more pipes downstream from the pump configured to simulate one or more plumbing flows across a structure or (ii) a pipette downstream from the pump configured to simulate a plumbing leak of the one or more pipes; (3) obtaining, from a water shut off valve downstream from the pump and upstream from the one or more pipes and the pipette, an output signal indicating a monitored flow rate of the liquid; and/or (4) determining whether the water shut off valve accurately controls the flow rate of the liquid based upon one or more of: (i) the simulated one or more plumbing flows, (ii) the simulated plumbing leak, or (iii) the output signal from the water shut off valve. The method may include additional, less, or alternate actions, including those discussed elsewhere herein.

Additionally or alternatively, in some embodiments, determining whether the water shut off valve accurately controls the flow rate of the liquid may include comparing the monitored flow rate from the water shut off valve to an actual flow rate of the liquid based upon at least one of: (i) the control signal to the pump or (ii) the one or more control signals to the one or more electronic valves or the pipette. In some embodiments, the comparison may be performed before the water shut off valve controls the flow rate of the liquid.

Additionally or alternatively, in some embodiments, the computer-implemented method may further include changing, by the one or more processors, the actual flow rate of the liquid by transmitting a control signal to the pump, the one or more electronic valves, or the pipette; and/or determining whether the water shut off valve detected a change in the actual flow rate of the liquid. Additionally or alternatively, in some embodiments, determining whether the water shut off valve accurately controls the flow rate of the liquid may include determining whether the water shut off valve halts the flow rate in response to detecting the change in the actual flow rate of the liquid.

Additionally or alternatively, in some embodiments, determining whether the water shut off valve accurately controls the flow rate of the liquid may include determining whether the water shut off valve halts the flow rate in response to the actual flow rate exceeding a flow rate threshold.

Additionally or alternatively, in some embodiments, the computer-implemented method may further include detecting, by the one or more processors, via a low water sensor coupled to a reservoir upstream from the pump, whether the reservoir is holding less than a threshold volume of the liquid and/or in response to detecting the reservoir is holding less than the threshold volume, turning off the pump.

Additionally or alternatively, in some embodiments, the computer-implemented method may further include detecting, by the one or more processors via a pressure sensor coupled to a pressure source downstream from the pump, that a current pressure at the pressure source is greater than a threshold maximum pressure and/or in response to detecting that the current pressure at the pressure source is greater than the threshold maximum pressure, turning off the pump. In some embodiments, the threshold maximum pressure may be approximately 80 psi. Additionally or alternatively, in some embodiments, the computer-implemented method may further include detecting, by the one or more processors via a pressure sensor coupled to a pressure source downstream from the pump, that a current pressure at the pressure source is less than a threshold minimum pressure and/or in response to detecting that the current pressure at the pressure source is less than the threshold maximum pressure, turning on the pump. In some embodiments, the threshold minimum pressure may be approximately 40 psi.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various embodiments of the systems and methods disclosed herein. It should be understood that the figures depict illustrative embodiments of the disclosed systems and methods, and that the figures are intended to be exemplary in nature. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
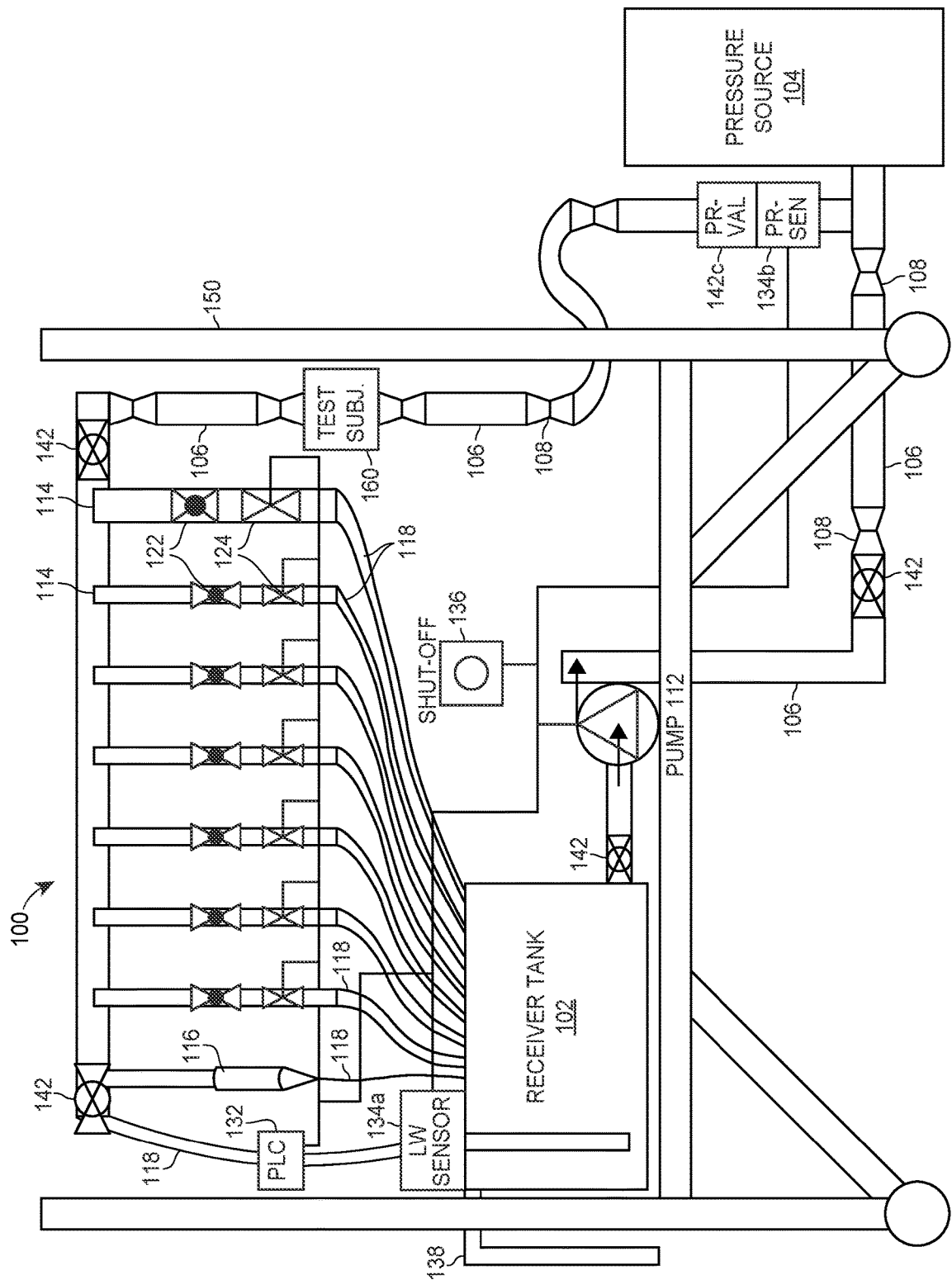
FIG. 1 depicts an exemplary structure plumbing flow simulation apparatus for testing water shut off valves.

The figures depict the present embodiments for purposes of illustration only. One skilled in the art will readily recognize from the following discussion that alternate embodiments of the structures and methods illustrated herein may be employed without departing from the principles of the invention described herein.

DETAILED DESCRIPTION

The present disclosure relates generally to a hydraulic system for testing water shut off valves that may include a reservoir, a pump, a pressure source, pipe(s), valve(s), and/or a pipette. The hydraulic system may simulate the plumbing flow of a structure by pumping a liquid housed in the reservoir through the pipe(s) and the valve(s) using the pump and the pressure source. The combination of pipes and valves may simulate the plumbing of various plumbing outlets. For example, a first pipe may simulate a kitchen sink, a second pipe may simulate a shower, a third pipe may simulate a toilet, a fourth pipe may simulate a garden hose, etc. The valve(s) may restrict the flow of the liquid through non-operating plumbing outlets (e.g., the valves to the pipes simulating the shower, toilet, and the garden hose may be closed) and/or control the flow rate of the liquid through operating plumbing outlets (e.g., the valve to the pipe simulating the kitchen sink may be partially opened to allow for a desired flow rate of the liquid). The pipette may divert an amount of the liquid from the pipe(s) to simulate a leak in the piping. The pipe(s) and the pipette may drain the liquid back into the reservoir.

An operator may test a water shut off valve by attaching the water shut off valve to the hydraulic system at a location directly upstream of the pipe(s) and downstream of the primary water source. The hydraulic system may test whether the water shut off valve can: (1) accurately monitor a flow rate through a structure, (2) accurately monitor a change in the flow rate through the structure, (3) cut off the flow of the liquid to the pipe(s) (e.g., by closing the water shut off valve) based upon (i) the monitored change in the flow rate through the structure and/or (ii) a timer expiring while the liquid flows through the hydraulic system, and/or (4) alert occupant(s) of a triggering event, such as a monitored change in the flow rate, a timer expiring, and/or the water shut off valve closing.

The hydraulic system may test whether the water shut off valve can accurately monitor the flow rate through a structure, the pump and the pressure system may pump pressurized liquid through a single pipe. The flow rate through the pipe is known by capturing a volume of liquid as it escapes a valve and measuring the volume over a period of time or via an externally mounted electronic flow rate measuring device. The hydraulic system may compare the known flow rate to the measured flow rate at the water shut off valve. If the difference between the measured flow rate and the known flow rate exceeds a desired threshold value, the water shut off valve may fail this test.

The hydraulic system may test whether the water shut off valve can accurately monitor a change in the flow rate through a structure, some of the liquid may be diverted from the single pipe to the pipette. As with the flow rate, the drip rate of the pipette is known by capturing a volume of liquid as it escapes the pipette and measuring the volume over a period of time. In some embodiments, the liquid is collected into a container and weighed to accurately determine the volume of the liquid. Even though no water is added or removed from the hydraulic system, and the hydraulic system is a closed loop, the drip rate of the pipette should cause a decrease in the overall flow rate caused by the pump, the pressure source, and the single opened pipe. The hydraulic system may then compare the known change in flow rate to the measured change in flow rate at the water shut off valve. If the difference between the measured change in flow rate and the known change in flow rate exceeds a desired threshold value, the water shut off valve may fail this test.

The hydraulic system may test whether the water shut off valve can cut off the flow of the liquid to the pipe(s) by closing the water shut off valve, one of two methods may be used. The first method is to reconduct the two foregoing tests. If the water shut off valve passes the above tests, the water shut off valve's capability to completely cut off the liquid to the pipe(s) may then be tested based upon the monitored change in the flow rate of the liquid. In response to detecting a change in the flow rate, such as a decrease in the flow rate over time, the water shut off valve should cut off the liquid to the pipe(s). The second method is to reconduct the flow rate test and allow the hydraulic system to pump the liquid for an extended period of time (e.g., one hour). If an internal timer at the water shut off valve expires while monitoring the flow rate (e.g., after thirty minutes) as water continues to flow through the pipes, the water shut off valve should close. If the water shut off valve allows a portion of the liquid to continue to pass through the pipe(s) after the timer should have expired, the water shut off valve may fail this test.

The hydraulic system may test whether the water shut off valve can alert occupant(s) of the structure of a triggering event, the previously described tests may be reconducted to determine whether the water shut off valve also emits an alert after detecting the change in the flow rate, after detecting the expiration of the timer, and/or after cutting off liquid flow to the pipe(s). If the water shut off valve does not emit an alert in these circumstances, the water shut off valve may fail this test.

The systems, methods, and techniques described herein may be implemented by various types of analogous parts or equipment. For example, a pipe and a valve may be substituted for a self-closing pipe that may be either manually or electrically operated.

Structure Plumbing Flow Simulation Apparatus

FIG. 1 depicts an exemplary structure plumbing flow simulation apparatus 100 for testing water shut off valves. The exemplary structure plumbing flow simulation apparatus 100 may include a receiver tank 102, a pressure source 104, connector(s) 106, connecting lock(s) 108, a pump 112, pipe(s) 114, a pipette 116, drain(s) 118, gate and/or globe valve(s) 122, electronic valve(s) 124, a programmable logic controller (PLC) 132, sensor(s) 134, a shut-off switch 136, an overflow tube 138, other valve(s) 142, scaffolding 150, and/or a water shut off valve 160 to test.

The receiver tank 102 may be any reservoir (e.g., a tank, a barrel, a bladder, etc.) able to hold a liquid at a set volume. In some embodiments, the liquid may be water, and the receiver tank 102 may be able to hold a volume of 25 gallons.

The pressure source 104 may be any pressurizing tank, device, or apparatus that may set the pressure of the structure plumbing flow simulation apparatus 100 to a set pressure range. For example, the pressure source 104 may be a pressure tank capable of pressurizing the structure plumbing flow simulation apparatus 100 to a range of 40 psi to 80 psi. The set pressure of the pressure source may be adjusted for the particular structure being simulated.

The connector(s) 106 may interconnect the various sections and/or components of the structure plumbing flow simulation apparatus 100. For example, the connector(s) 106 may connect the receiver tank 102 to the pressure source 104. The connector(s) 106 may be tube(s), pipe(s), hose(s), and/or the like.

The connecting lock(s) 108 may connect the connector(s) 106 to the various sections and/or components of the structure plumbing flow simulation apparatus 100. For example, the connecting lock(s) 108 may connect the connector(s) 106 to the pressure source 104. Additionally or alternatively, connecting lock(s) 108 may interconnect the connector(s) 106 with one another. For example, the connecting lock(s) 108 may connect a connector 106 to the receiver tank 104 and another connector 106 as illustrated in FIG. 1.

The pump 112 may pump the liquid stored in the receiver tank across the structure plumbing flow simulation apparatus 100 at a set liquid flow rate. The pump 112 may be electronically controlled. In some embodiments, the pump 112 may be instructed to change the liquid flow rate across the exemplary structure plumbing flow simulation apparatus 100. Alternatively, in some embodiments, the pump 112 pumps the liquid at a set flow rate across the exemplary structure plumbing flow simulation apparatus 100. The pump 112 may be directly connected to the receiver tank 102 and/or the pump 112 may be indirectly connected to the receiver tank 102 via the connector(s) 106 and/or the connecting lock(s) 108.

The pipe(s) 114 may be connected to the connector(s) 106. The pipe(s) 114 may be used to simulate plumbing flow(s) across a structure (e.g., a residence, a commercial building, etc.). For example, a first pipe may be used to simulate the plumbing flow of a kitchen sink, a second pipe may be used to simulate the plumbing flow of a refrigerator, a third pipe may be used to simulate the plumbing flow of a toilet, a fourth pipe may be used to simulate the plumbing flow of a dish washer, a fifth pipe may be used to simulate the plumbing flow of a washing machine, and so on. The pipe(s) 114 may be tube(s), pipe(s), hose(s), and/or the like. The width of the pipe(s) may be selected based upon the piping used in the particular structure being simulated.

The pipette 116 may also be connected to the connector(s) 106. The pipette 116 may have a drip rate allowing the pipette 116 to be used to simulate a leak across the pipe(s) 114. In some embodiments, the drip rate of the pipette 116 may be altered by actuating the pipette 116. Also in some embodiments, the drip rate of the pipette 116 may be altered electronically. In other embodiments, the drip rate of the pipette 116 may be controlled by a valve (e.g., a gate and/or globe valve 122 and/or an electronic valve 124). The pipette 116 may be a tube, a pipe, a hose, and/or the like.

The drain(s) 118 may be connected to the pipe(s) 114 and/or the pipette 116 and receiver tank 102 allowing the pipe(s) 114 and/or the pipette 116 to drain the liquid into the receiver tank 102.

The gate and/or globe valve(s) 122 may be connected to the pipe(s) 114. The gate and/or globe valve(s) 122 may restrict the plumbing flow to the pipe(s) 114 and/or the pipette 116. In some embodiments, a gate and/or globe valve 122 is attached to each pipe 114, as illustrated in FIG. 1. In these embodiments, each gate and/or globe valve 122 may restrict the liquid flow to each pipe 114. As such, when the gate and/or globe valve 122 is in the closed position, no liquid may flow through the corresponding pipe 114. Conversely, when the gate and/or globe valve 122 is in the open position, liquid may flow though the corresponding pipe 114. Similarly, in some embodiments, a gate and/or globe valve 122 may also be connected to the pipette 116. In these embodiments, the gate and/or globe valve 122 may restrict the drip rate of the pipette 116. For example, when the gate and/or globe valve 122 is in the closed position, no liquid may flow through the pipette 116. Conversely, when the gate and/or globe valve 122 is in the open position, liquid may flow though the pipette 116. The gate and/or globe valve(s) 122 may be mechanical in nature.

The electronic valve(s) 124 may be connected to the pipe(s) 114. The electronic valve(s) 124 may restrict the plumbing flow to the pipe(s) 114 and/or the pipette 116. In some embodiments, an electronic valve 124 is attached to each pipe 114, as illustrated in FIG. 1. In some embodiments, each electronic valve 124 may adjust the liquid flow to each pipe 114. The electronic valve(s) 124 may be precisely opened and/or closed by a set amount to set the flow rate through the corresponding pipe 114. In some embodiments, this set amount is preset and/or changed by an electronic controller (e.g., a processor or programmable logic controller) communicatively coupled to the electronic valve(s) 124. Additionally or alternatively, in some embodiments, the electronic valve(s) 124 may only fully close or open the pipe(s) 114 and/or the pipette 116.

Similarly, in some embodiments, an electronic valve 124 may also be connected to the pipette 116. In these embodiments, the electronic valve 124 may adjust the drip rate of the pipette 116. The electronic valve 124 may be precisely opened and/or closed by a set amount to set the drip rate through the pipette 116. In some embodiments, this set amount is preset and/or changed by an electronic controller (e.g., a processor or programmable logic controller) communicatively coupled to the electronic valve 124. In some embodiments, the pipette may be adjusted directly via the electronic controller (e.g., the pipette may adjust the drip rate without the need for an electronic valve 124). The electronic valves 124 may be solenoid valves, motor-operated valves, statically loaded valves, or any other electrically operated and/or actuated valves.

The programmable logic controller (PLC) 132 may be, or may include, processor(s) and/or processing unit(s) or component(s). For example, the PLC 132 may include central processing unit(s) (CPUs), coprocessor(s), microprocessor(s), graphical processing unit(s) (GPUs), digital signal processor(s) (DSPs), application specific integrated circuit(s) (ASICs), programmable logic device(s) (PLDs), field-programmable gate array(s) (FPGAs), field-programmable logic device(s) (FPLDs), microcontroller unit(s) (MCUs), hardware accelerator(s), special-purpose computer chip(s), and system-on-a-chip (SoC) device(s), etc. The PLC 132 may have register(s) capable of storing and executing pre-programmed instruction(s).

In some embodiments, the PLC 132 may be configured to activate and/or control the pump 112 to set the plumbing flow of the exemplary structure plumbing flow simulation apparatus 100 to a set plumbing flow rate. Additionally or alternatively, the PLC 132 may be configured to control the electronic valve(s) 124 to adjust the plumbing flow rate passing through the pipe(s) 114 and/or the pipette 116. In some embodiments, the PLC also evaluates whether the water shut off valve passes or fails any tests.

The sensor(s) 134 may be, or may include, sensor(s) that trigger upon the detection of a particular stimuli. For example, the sensor(s) 134 may be, or may include, a low water sensor 134a that triggers when the volume of liquid in the receiver tank 102 is below a set threshold volume and/or a pressure sensor 134b that triggers when the pressure across the structure plumbing flow simulation apparatus 100 exceeds a set threshold pressure. The sensor(s) 134 may be communicatively coupled to the pump 112 and/or the PLC 132. To protect the various sections and/or components of the exemplary structure plumbing flow simulation apparatus 100, the sensor(s) 134 may be configured to shut off the pump 112 upon the triggering of one or more conditions.

For example, a low water sensor 134a may be installed at the receiver tank 102. In the instances where the low water sensor 134a detects that the liquid volume in the receiver tank 102 falls below a set threshold volume, the low water sensor 134a may send a halting signal to the pump 112 or otherwise cut power to the pump 112.

As another example, a pressure sensor 134b may be installed to the pressure source 104. In the instances where the pressure sensor 134b detects that the pressure across the structure plumbing flow simulation apparatus 100 exceeds a set threshold pressure, the pressure sensor 134b may send a halting signal to the pump 112 or otherwise cut power to the pump 112. In some embodiments, the threshold pressure is 80 psi, which may correspond to a typical maximum pressure for liquid pumped through a structure.

The shut-off switch 136 may be a mechanical and/or electronic switch that halts the pump 112 or otherwise cuts power to the pump 112 upon activation.

The overflow tube 138 may be connected to the receiver tank 102 to allow overflow liquid which exceeds the maximum volume in the receiver tank 102 to escape the receiver tank 102. The overflow tube 138 may be a tube, a pipe, a hose, and/or the like.

The other valve(s) 142 may be valves attached to various sections and/or components of the exemplary structure plumbing flow simulation apparatus 100 (e.g., the connector(s) 106). The other valve(s) 142 may open, close, or restrict the plumbing flow to the various sections and/or components of the exemplary structure plumbing flow simulation apparatus 100. The other valve(s) 142 may be mechanical valves (e.g., the gate and/or globe valve(s) 122), electronic valves (e.g., the electronic valve(s) 124), and/or pressure reducing valves (not shown).

The scaffolding 150 may house and/or support the various sections and/or components of the exemplary structure plumbing flow simulation apparatus 100. The scaffolding 150 may be constructed of a rigid material that may support the weight of the scaffolding 150 and the various sections and/or components of the exemplary structure plumbing flow simulation apparatus 100. The scaffolding 150 may include wheels and/or casters that are coupled to the bottom surfaces of the scaffolding 150. The wheels or casters may allow the exemplary structure plumbing flow simulation apparatus 100 to be moved and transported.

The water shut off valve 160 may be any sort of commercially available water shut off valve. The water shut off valve 160 may include sensor(s) to detect the flow rate of the liquid passing through the water shut off valve 160. Additionally, the water shut off valve 160 may close upon a programmed triggering detection, thereby preventing the liquid from passing through the water shut off valve 160. In some embodiments, the programmed triggering detection is a drop in flow rate. A drop in the flow rate may indicate that there is a leak in the plumbing. Closing the water shut off valve 160 may prevent further damage to the plumbing system and/or the structure housing the plumbing system. In some embodiments, the programmed triggering detection is a timer expiring. The water shut off valve 160 may have a timer to track the duration of continuous water flow through a structure. Closing the water shut off valve 160 may prevent excessive water usage (e.g., in areas suffering from a drought or to lower a home owner's water utilities bill, etc.).

In some embodiments, the water shut off valve 160 may be able to electronically communicate with external device(s). For example, the water shut off valve 160 may be able to connect to a user device (e.g., a laptop, a desktop, a smartphone, etc.) over one or more networks (e.g., via a wired connection, such as by an ethernet cable, or a wireless connection, such as via Wi-Fi, Bluetooth®, etc.) to alert a user of a triggering event. In some embodiments, electronic communication may be facilitated via an application (e.g., a web-based application, a mobile application, etc.) wherein the water shut off valve 160 communicates with an application server and the application server in turn communicates with the user device. The user device may be able to remotely control the water shut off valve 160. For example, the user device may be able to instruct the water shut off valve 160 (e.g., via the application) to open (e.g., once the user has fixed a leak in the plumbing, etc.).

It should be noted that while a particular selection and number of sections and/or components of the exemplary structure plumbing flow simulation apparatus 100 are depicted in FIG. 1, more, less, and/or alternative sections and/or components are contemplated. Similarly, while a particular arrangement of the various sections and/or components of the exemplary structure plumbing flow simulation apparatus 100 are depicted in FIG. 1, alternative arrangements are also contemplated. It should be appreciated that the various sections and/or components of the exemplary structure plumbing flow simulation apparatus 100 need not be composed of a particular material.

Programmable Logic Controller Circuit

Figure 2:
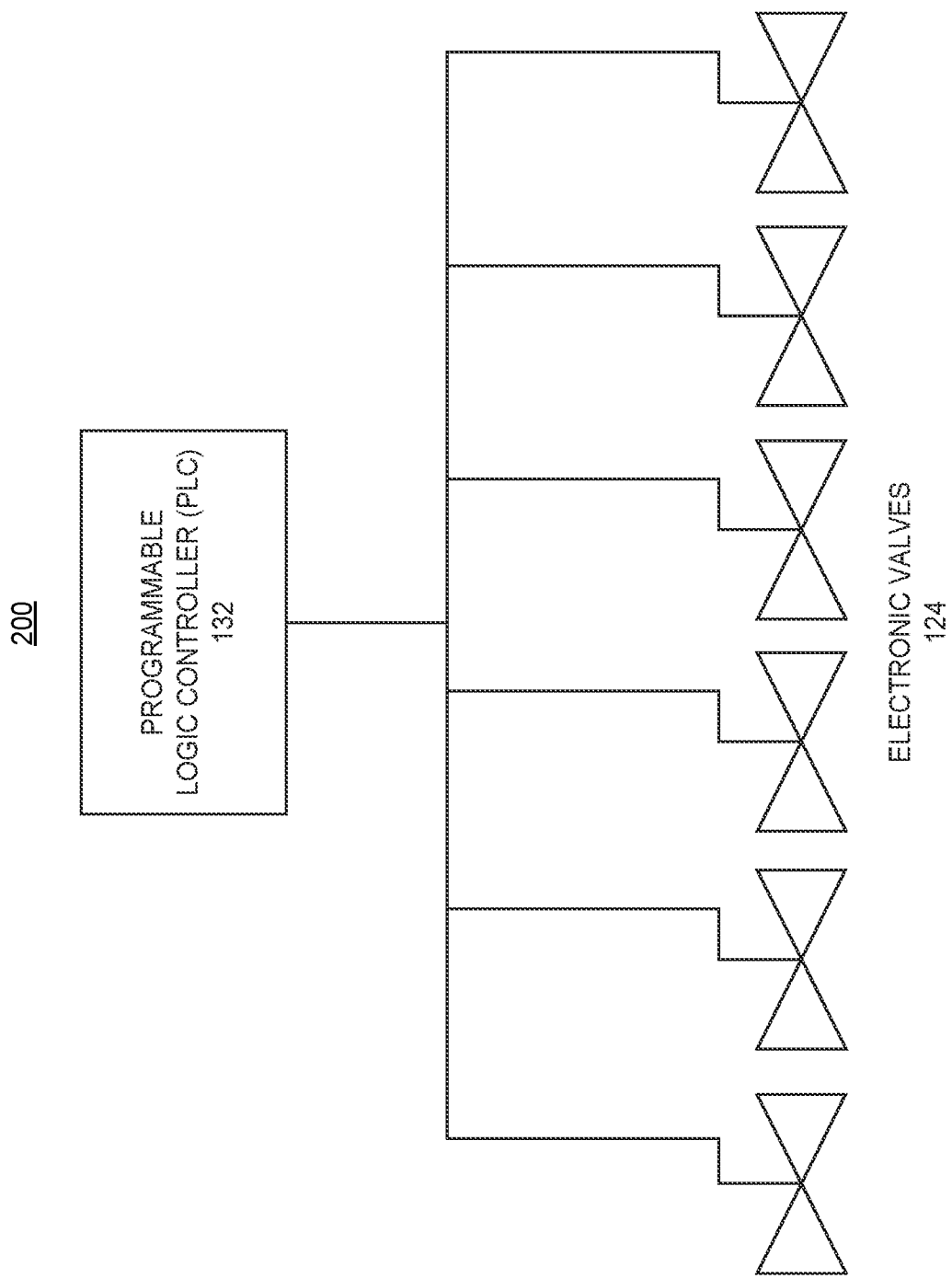
FIG. 2 depicts an exemplary programmable logic controller circuit configured to control electronics integrated with the structure plumbing flow simulation apparatus.

FIG. 2 depicts an exemplary programmable logic controller (PLC) circuit 200 configured to control electronics integrated with the structure plumbing flow simulation apparatus. The exemplary programmable logic controller circuit 200 may include the pipette 116, the electronic valve(s) 124, and/or the PLC 132. In some embodiments, the exemplary programmable logic controller circuit 200 may also include the pump 112.

The PLC 132 may be configured to control the electronic valve(s) 124 to adjust the plumbing flow rate passing through the pipe(s) 114 and/or the pipette 116. In some embodiments, the pipette 116 may be connected and/or controlled by the PLC 132 directly, in which case the PLC 132 may be configured to control the drip rate of the pipette 116. As illustrated in FIG. 2, the PLC 132 may have a wired connection to the electronic valve(s) 124 and/or the pipette 116. In some embodiments, the PLC 132 is wirelessly connected to the electronic valves 124 and/or the pipette 116 (e.g., via BlueTooth®, Wi-Fi, etc.). The PLC 132 may send electronic signals to the electronic valve(s) 124 and/or the pipette 116 instructing each valve 124 and/or the pipette 116 to: (i) fully open, (ii) fully close, or (iii) open by a set amount.

Additionally or alternatively, in some embodiments, the PLC 132 may also be configured to activate and/or control the pump 112 to set the plumbing flow of the structure plumbing flow simulation apparatus 100 to a set plumbing flow rate. Additionally or alternatively, in some embodiments, the PLC also evaluates whether the water shut off valve passes or fails any tests. In other embodiments, a separate processing unit evaluates whether the water shut off valve passes or fails any tests.

Shut Off Circuitry

Figure 3:
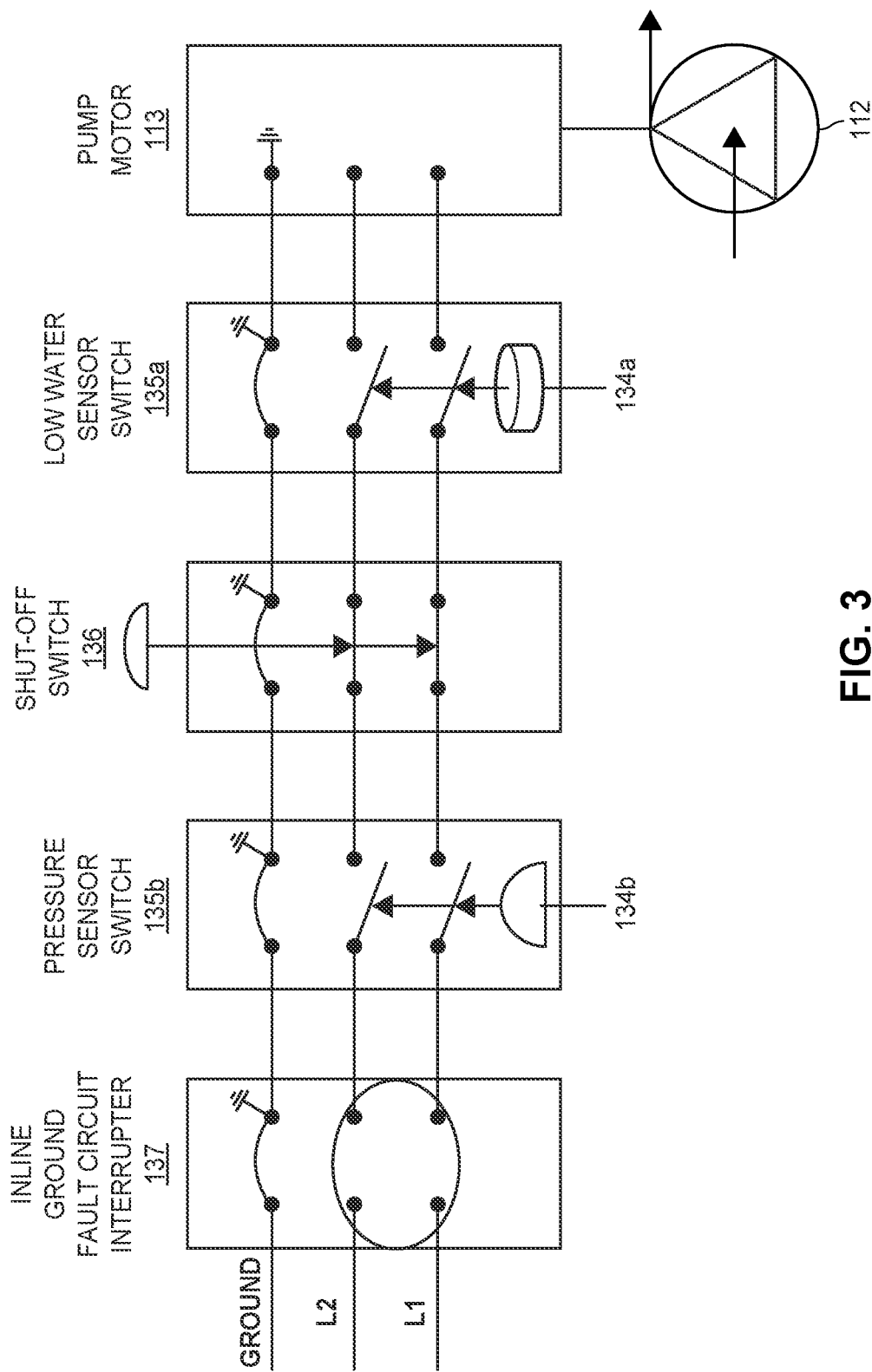
FIG. 3 depicts exemplary shut off circuitry of the structure plumbing flow simulation apparatus.

FIG. 3 depicts exemplary shut off circuitry 300 of the structure plumbing flow simulation apparatus. The exemplary shut off circuitry 300 may include a low water sensor switch 135a, a pressure sensor switch 135b, a shut-off switch 136, and/or an inline ground fault circuit interrupter 137. In some embodiments, the exemplary shut off circuitry 300 is connected to the exemplary programmable logic controller circuit 200.

FIG. 3 illustrates a circuit of two interconnecting wires, a positive (L1) and a negative (L2) wiring, delivering an electrical load from a power source (not shown) to the pump motor 113. A third wire, Ground, connects the circuit to the ground. To protect the various sections and/or components of the structure plumbing flow simulation apparatus 100, the sensor(s) 134 may be connected to switch(es) to cut electricity to the pump motor 113. For example, the low water sensor 134a may be connected to the low water sensor switch 135a. When the low water sensor 134a detects the liquid in the reservoir has fallen below the threshold volume, a signal from the low water sensor 134a may be sent to the low water switch 135a to open the circuit and halt the flow of electricity to the pump motor 113.

As another example, the pressure sensor 134b may be connected to the pressure sensor switch 135b. When the pressure sensor 134b detects the pressure has exceeded a threshold maximum pressure, a signal from the pressure sensor 134b may be sent to the pressure sensor switch 135b to open the circuit and halt the flow of electricity to the pump motor 113. When the pressure sensor 134b detects the pressure has fallen below a threshold minimum pressure, a signal from the pressure sensor 134b may be sent to the pressure sensor switch 135b to close the circuit and enable the flow of electricity to the pump motor 113.

The shut-off switch 136 may be a manual switch operated by a user. When activated, the shut-off switch 136 may open the circuit and halt the flow of electricity to the pump motor 113 and/or may close the circuit and enable the flow of electricity to the pump motor 113. The shut-off switch 136 may be either mechanical or electronic in nature.

The inline ground fault circuit interrupter 137 may be connected to the ground line as well as L1 and L2 and may monitor the circuit for residual current (also referred to as current leakage). If the inline ground fault circuit interrupter 137 detects a residual current, the inline ground fault circuit interrupter 137 may quickly break the circuit.

Exemplary Computer-Implemented Method for Testing Water Shut Off Valves

Figure 4:
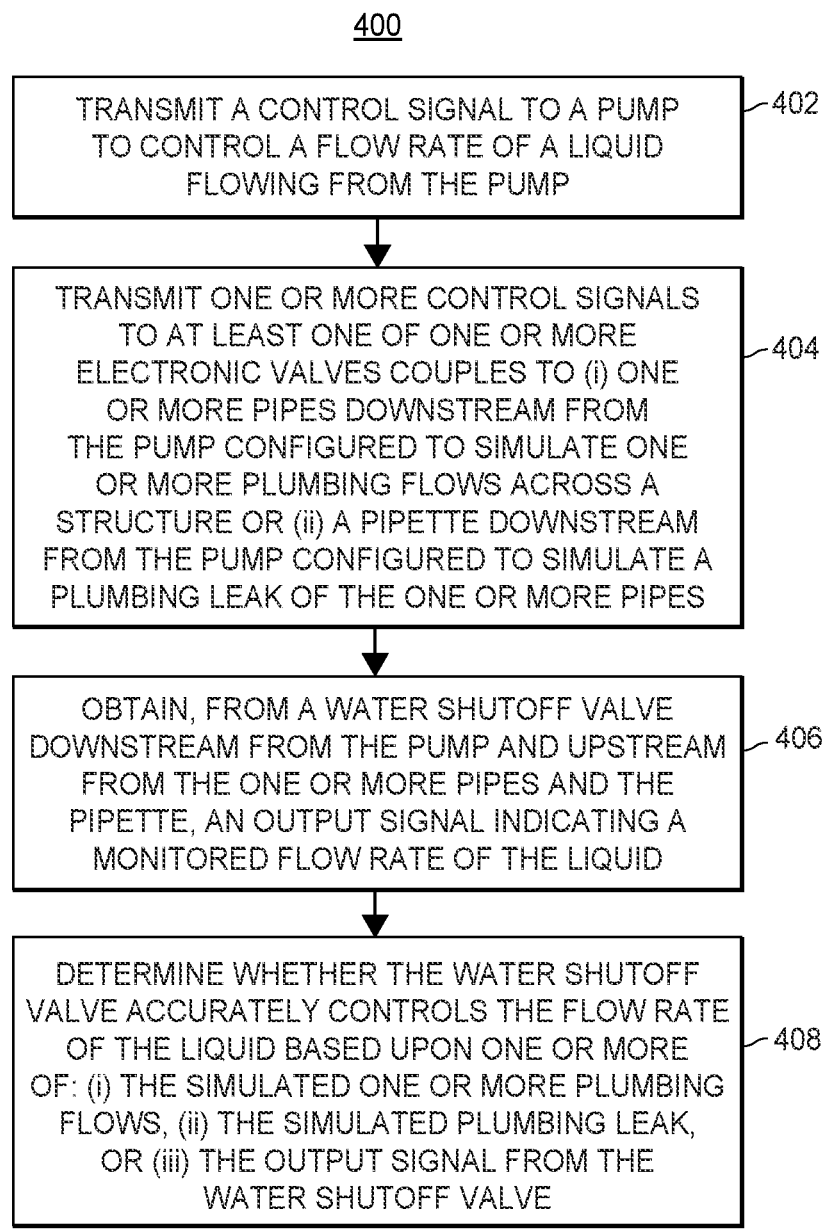
FIG. 4 depicts a flow diagram of an example method for testing water shut off valves using the structure plumbing flow simulation apparatus.

FIG. 4 is a block diagram of an exemplary flowchart for an example computer-implemented method 400 for testing water shut off valves using a structure plumbing flow simulation apparatus 100. The method 400 may employ any of the components, apparatuses, devices, processors, wiring, transceivers, electronic or electric components and valves, and/or systems described herein with respect to FIGS. 1-3.

The computer-implemented method 400 may begin at block 402 by transmitting a control signal to a pump (e.g., the pump 112) to control a flow rate of a liquid flowing from the pump.

In some embodiments, a programming logic controller (PLC) (e.g., the PLC 132) of a hydraulic system (e.g., the exemplary structure plumbing flow simulation apparatus 100) may be configured to transmit the control signal to the pump. Additionally or alternatively, the set flow rate of the liquid flowing from the pump may be pre-programmed into the PLC.

The method and/or operation 400 may proceed to block 404 by transmitting control signal(s) to electronic valve(s) (e.g., the electronic valve(s) 124) coupled to (i) pipe(s) (e.g., the pipe(s) 114) downstream from the pump configured to simulate plumbing flow(s) across a structure or (ii) a pipette (e.g., the pipette 116) downstream from the pump configured to simulate a plumbing leak of the pipe(s).

The PLC may also be configured to transmit the control signal(s) to the electronic valve(s) and/or the pipette. The control signal(s) may actuate the electronic valve(s) by an amount to control the flow rate of the liquid across the pipe(s) and/or the pipette. In some embodiments, an opening of the pipette may be actuated directly by the PLC to allow for a particular drip rate of the pipette. Additionally or alternatively, the degree by which the electronic valve(s) and/or the pipette may be instructed to be opened may be pre-programmed into the PLC.

The method and/or operation 400 may proceed to block 406 by obtaining, from a water shut off valve (e.g., the water shut off valve 160) downstream from the pump and upstream from the pipe(s) and the pipette, an output signal indicating a monitored flow rate of the liquid.

In some embodiments, the output signal may also include a record of previously monitored flow rates. Additionally or alternatively, in some embodiments, the output signal may also include the duration of the monitored flow rate. For example, the water shut off valve may determine the duration in which the water shut off valve monitors the liquid flow rate. In this example, the output signal may include the duration. Additionally or alternatively, in some embodiments, the water shut off valve may also compare the duration to a threshold duration, and the output signal may include an indication that the duration has reached the threshold duration.

In some embodiments, the output signal may be displayed on the water shut off valve (e.g., on a mechanical and/or electronic display). In some embodiments, a component may be communicatively coupled to the water shut off valve (e.g., the PLC 132, a separate processing unit, and/or a separate evaluation device) that may read and/or display the output signal. In some embodiments, the water shut off valve may transmit the output signal to an external device (e.g., a smartphone) via a wired and/or wireless connection.

The method and/or operation 400 may proceed to block 408 by determining whether the water shut off valve accurately controls the flow rate of the liquid based upon one or more of: (i) the simulated plumbing flow(s), (ii) the simulated plumbing leak, or (iii) the output signal from the water shut off valve.

In some embodiments, the electronic valve(s) connected to the pipe(s) may be actuated in conjunction with a pump speed of the pump to create a flow rate across the hydraulic system. This flow rate may be used as a simulation of a particular liquid flow rate of a structure. In these embodiments, the output signal of the water shut off valve may be compared to the plumbing flow generated by the pump and/or the electronic valve(s). If the output signal differs from the known plumbing flow by more than a threshold margin of error, the water shut off valve may be considered defective.

Additionally or alternatively, in some embodiments, the pipette and/or electronic valve(s) connected to the pipette may be actuated to create a drip flow rate that will decrease the flow rate generated by the pump and the electronic valve(s) connected to the pipe(s). This drip flow rate may be used to simulate a leak in the pipe(s). In these embodiments, the output signal of the water shut off valve may be compared to the plumbing flow generated by the pump, the electronic valve(s), and/or the pipette. If the output signal differs from the known change in plumbing flow by more than a threshold margin of error, the water shut off valve may be considered defective.

Additionally or alternatively, in some embodiments, after the pump, the electronic valve(s), and/or the pipette create a first flow rate, and the water shut off valve detects and/or outputs a first monitored flow rate, the pump, the electronic valve(s), and/or the pipette may create a second flow rate. The water shut off valve may then detect and/or output a second monitored flow rate, and this second monitored flow rate may be compared to the second flow rate to determine if the water shut off valve can accurately detect changes in the flow rate across the structure plumbing flow simulation apparatus 100. If the second monitored flow rate differs from the known second flow rate by more than a threshold margin of error, the water shut off valve may be considered defective.

Additionally or alternatively, in some embodiments, the water shut off valve may monitor the amount of time that has passed since flow rate(s) have been monitored. The water shut off valve may have a mechanical or electrical timer that measures time. If the time value measured by the water shut off valve is inaccurate and/or the output signal does not indicate that the timer expired when it should have, the water shut off valve may be considered defective.

Additionally or alternatively, in some embodiments, the water shut off valve may control the flow rate of the liquid based upon (i) the second monitored flow rate (e.g., if the water shut off valve detects the simulated leak caused by the pipette) and/or (ii) the timer expiring. For example, the water shut off valve may cut off the liquid flow through the hydraulic system if the water shut off valve detects a second monitored flow rate which is less than a first monitored flow rate (thereby indicating the presence of a leak somewhere in the piping). As another example, the water shut off valve may cut off the liquid flow through the hydraulic system if the water shut off valve detects that the timer has expired (thereby indicating excessive water usage). If the water shut off valve does not close or reduce the flow rate by a desired amount, the water shut off valve may be considered defective.

Additionally or alternatively, in some embodiments, the water shut off valve may alert operator(s) of the hydraulic system in response to detecting a triggering event. For example, the water shut off valve may alert the operator(s) that a leak has been detected based upon determining a decrease in the flow rate over time (e.g., when a second monitored flow rate is less than a first monitored flow rate). The water shut off valve may present this alert via a display of the water shut off valve. As another example, the water shut off valve may alert the operator(s) that the water shut off valve cut off the liquid flow to the rest of the hydraulic system by sending a text message and/or application message to a user device of the operator(s). In some embodiments, a component may be communicatively coupled to the water shut off valve (e.g., the PLC 132, a separate processing unit, and/or a separate evaluation device) that assesses whether the water shut off valve presents an alert to the operator(s). If the water shut off valve does not present an expected alert to the operator(s), the water shut off valve may be considered defective.

The method and/or operation 400 may have more or less or different steps and/or may be performed in a different sequence.

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, some embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "receiving," "analyzing," "generating," "creating," "storing," "deploying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "some embodiments" means that a particular element, feature, structure, or characteristic described in connection with the embodiment may be included in at least one embodiment. The appearances of the phrase "some embodiments" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the above-described detailed description be regarded as illustrative rather than limiting, and that it be understood that it is the following claims, including all equivalents, that are intended to define the spirit and scope of this invention.

What is claimed:

1. A hydraulic system for testing water shut off valves, comprising:
    a reservoir configured to hold a set volume of a liquid;
    a pump connected to the reservoir configured to pump the liquid;
    a pressure source connected to the pump and configured to pressurize the liquid from the pump which flows to a water shut off valve downstream of the pressure source;
    one or more pipes connected to the pressure source and adapted to be connected to the water shut off valve, wherein the one or more pipes are configured to simulate one or more plumbing flows across a structure; and
    a pipette connected to the one or more pipes, wherein the pipette is configured to simulate a plumbing leak of the one or more pipes,
    wherein the hydraulic system detects whether the water shut off valve accurately controls a flow rate of the liquid based upon one or more of: (i) the simulated one or more plumbing flows or (ii) the simulated plumbing leak.

2. The hydraulic system of claim 1, further comprising:
    one or more electronic valves connected to the one or more pipes, wherein each of the one or more electronic valves control a flow rate of the liquid passing through a corresponding connected pipe;
    one or more sensors; and
    a programable logic controller (PLC) communicatively coupled to the one or more sensors and the one or more electronic valves, the PLC configured to:
        control the flow rate of the liquid through the one or more electronic valves, and
        control a pump speed of the pump.

3. The hydraulic system of claim 2, wherein the one or more sensors include a low water sensor configured to detect a water level in the reservoir, wherein the low water sensor is configured to turn off the pump upon detection that the reservoir is holding less than a threshold volume of the liquid.

4. The hydraulic system of claim 3, wherein the PLC is further configured to:
    detect, via the low water sensor, whether the reservoir is holding less than the threshold volume of the liquid, and
    in response to detecting the reservoir is holding less than the threshold volume, turn off the pump.

5. The hydraulic system of claim 2, wherein the one or more sensors include a pressure sensor configured to detect a current pressure at the pressure source, wherein the pressure sensor is configured to turn off the pump upon detection that the current pressure at the pressure source is greater than a threshold maximum pressure.

6. The hydraulic system of claim 5, wherein the PLC is further configured to:
    detect, via the pressure sensor, that the current pressure at the pressure source is greater than the threshold maximum pressure, and
    in response to detecting the current pressure at the pressure source is greater than the threshold maximum pressure, turn off the pump.

7. The hydraulic system of claim 6, wherein the threshold maximum pressure is approximately 80 psi.

8. The hydraulic system of claim 1, further comprising:
    a shut-off switch connected to the pump, wherein activation of the shut-off switch turns off the pump.

9. The hydraulic system of claim 1, further comprising:
one or more drains connecting the one or more pipes and the pipette to the reservoir.

10. The hydraulic system of claim 9, further comprising:
the water shut off valve configured to monitor the flow rate of the liquid.

11. The hydraulic system of claim 10, further comprising:
a scaffolding configured to support one or more of: the reservoir, the pump, the pressure source, the one or more pipes, the pipette, the water shut off valve, or the one or more drains.

12. The hydraulic system of claim 1, further comprising:
an overflow tube connected to the reservoir, the overflow tube configured to allow for at least some of the liquid to escape the reservoir when an amount of the liquid exceeds the set volume.

13. A computer-implemented method for testing water shut off valves, comprising:
transmitting a control signal to a pump to control a flow rate of a liquid flowing from the pump;
transmitting, by the one or more processors, one or more control signals to at least one of one or more electronic valves coupled to (i) one or more pipes downstream from the pump configured to simulate one or more plumbing flows across a structure or (ii) a pipette downstream from the pump configured to simulate a plumbing leak of the one or more pipes;
obtaining, from a water shut off valve downstream from the pump and upstream from the one or more pipes and the pipette, an output signal indicating a monitored flow rate of the liquid; and
determining whether the water shut off valve accurately controls the flow rate of the liquid based upon one or more of: (i) the simulated one or more plumbing flows, (ii) the simulated plumbing leak, or (iii) the output signal from the water shut off valve.

14. The computer-implemented method of claim 13, wherein determining whether the water shut off valve accurately controls the flow rate of the liquid comprises:
comparing the monitored flow rate from the water shut off valve to an actual flow rate of the liquid based upon at least one of: (i) the control signal to the pump or (ii) the one or more control signals to the one or more electronic valves or the pipette.

15. The computer-implemented method of claim 14, wherein the comparison is performed before the water shut off valve controls the flow rate of the liquid.

16. The computer-implemented method of claim 14, further comprising:
changing, by the one or more processors, the actual flow rate of the liquid by transmitting a control signal to the pump, the one or more electronic valves, or the pipette; and
determining whether the water shut off valve detected a change in the actual flow rate of the liquid.

17. The computer-implemented method of claim 16, wherein determining whether the water shut off valve accurately controls the flow rate of the liquid includes:
determining whether the water shut off valve halts the flow rate in response to detecting the change in the actual flow rate of the liquid.

18. The computer-implemented method of claim 14, wherein determining whether the water shut off valve accurately controls the flow rate of the liquid includes:
determining whether the water shut off valve halts the flow rate in response to the actual flow rate exceeding a flow rate threshold.

19. The computer-implemented method of claim 13, further comprising:
detecting, by the one or more processors, via a low water sensor coupled to a reservoir upstream from the pump, whether the reservoir is holding less than a threshold volume of the liquid, and
in response to detecting the reservoir is holding less than the threshold volume, turning off the pump.

20. The computer-implemented method of claim 13, further comprising:
detecting, by the one or more processors via a pressure sensor coupled to a pressure source downstream from the pump, that a current pressure at the pressure source is greater than a threshold maximum pressure, and
in response to detecting that the current pressure at the pressure source is greater than the threshold maximum pressure, turning off the pump.

21. The computer-implemented method of claim 13, further comprising:
detecting, by the one or more processors via a pressure sensor coupled to a pressure source downstream from the pump, that a current pressure at the pressure source is less than a threshold minimum pressure, and
in response to detecting that the current pressure at the pressure source is less than the threshold minimum pressure, turning on the pump.

* * * * *